US007613528B2

(12) United States Patent  
Shirota

(10) Patent No.: US 7,613,528 B2  
(45) Date of Patent: Nov. 3, 2009

(54) MICROSCOPE-USE COMPONENT AND MICROSCOPE SYSTEM CONSTITUTED BY THE MICROSCOPE-USE COMPONENT

(75) Inventor: Tetsuya Shirota, Tokyo (JP)

(73) Assignee: Olympus Corporation, Tokyo (JP)

( * ) Notice: Subject to any disclaimer, the term of this patent is extended or adjusted under 35 U.S.C. 154(b) by 207 days.

(21) Appl. No.: 11/818,933

(22) Filed: Jun. 15, 2007

(65) Prior Publication Data

US 2008/0068708 A1  Mar. 20, 2008

(30) Foreign Application Priority Data

Jun. 26, 2006  (JP)  .............................. 2006-175095

(51) Int. Cl.
*G05B 11/01* (2006.01)
*G02B 13/14* (2006.01)
*G05B 15/00* (2006.01)
*G02B 21/00* (2006.01)
*G02B 21/02* (2006.01)

(52) U.S. Cl. .............................. 700/19; 700/17; 700/83; 359/368; 359/370; 359/382; 359/656; 359/657; 348/79

(58) Field of Classification Search ................. 700/160, 700/180, 17, 19, 83; 359/368, 382, 656, 359/370, 657; 348/79; 356/501; 600/447
See application file for complete search history.

(56) References Cited

U.S. PATENT DOCUMENTS

| 5,185,638 | A * | 2/1993 | Conzola et al. ........... 356/237.2 |
| 6,707,604 | B2 * | 3/2004 | Hakozaki .................. 359/368 |
| 2003/0107800 | A1 | 6/2003 | Doering et al. |
| 2003/0198318 | A1 * | 10/2003 | Price et al. ................. 378/122 |
| 2005/0111086 | A1 * | 5/2005 | Knoblich et al. ............ 359/368 |
| 2005/0146716 | A1 * | 7/2005 | Dixon et al. .............. 356/237.4 |
| 2005/0179998 | A1 | 8/2005 | Studer et al. |
| 2006/0285122 | A1 * | 12/2006 | Bankhead et al. ........... 356/511 |
| 2007/0096038 | A1 * | 5/2007 | Tsai et al. ................. 250/458.1 |

FOREIGN PATENT DOCUMENTS

| DE | 10 2004 048 099 A1 | 4/2006 |
| JP | 2005-157340 A | 6/2005 |
| WO | WO9913360 A2 * | 3/1999 |
| WO | WO 2006/037490 A1 | 4/2006 |

OTHER PUBLICATIONS

Extended European Search Report dated Jan. 22, 2009, 6 pages, issued in counterpart European Application No. EP 07012498.7-1234.

* cited by examiner

*Primary Examiner*—Ramesh B Patel
(74) *Attorney, Agent, or Firm*—Frishauf, Holtz, Goodman & Chick, P.C.

(57) ABSTRACT

A plurality of microscope-use components are provided for interconnection in a microscope system. Each of the microscope-use components includes a communication interface which enables communication with a control apparatus of the microscope system by a prescribed communication system; a connection component-related information obtainment unit for obtaining connection component-related information that is related to another microscope-use component from a connectable other microscope-use component; and a control unit for transmitting, to the control apparatus of the microscope system by way of the communication interface, the connection component-related information of the other microscope-use component obtained by the connection component-related information obtainment unit and microscope-use component itself-related information that is related to the present microscope-use component.

22 Claims, 12 Drawing Sheets

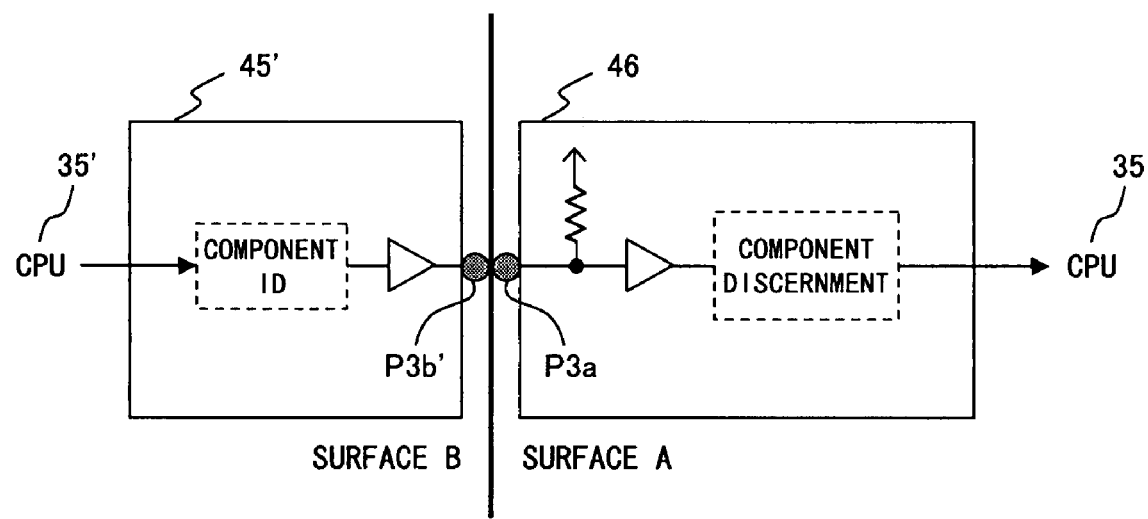
F I G. 6

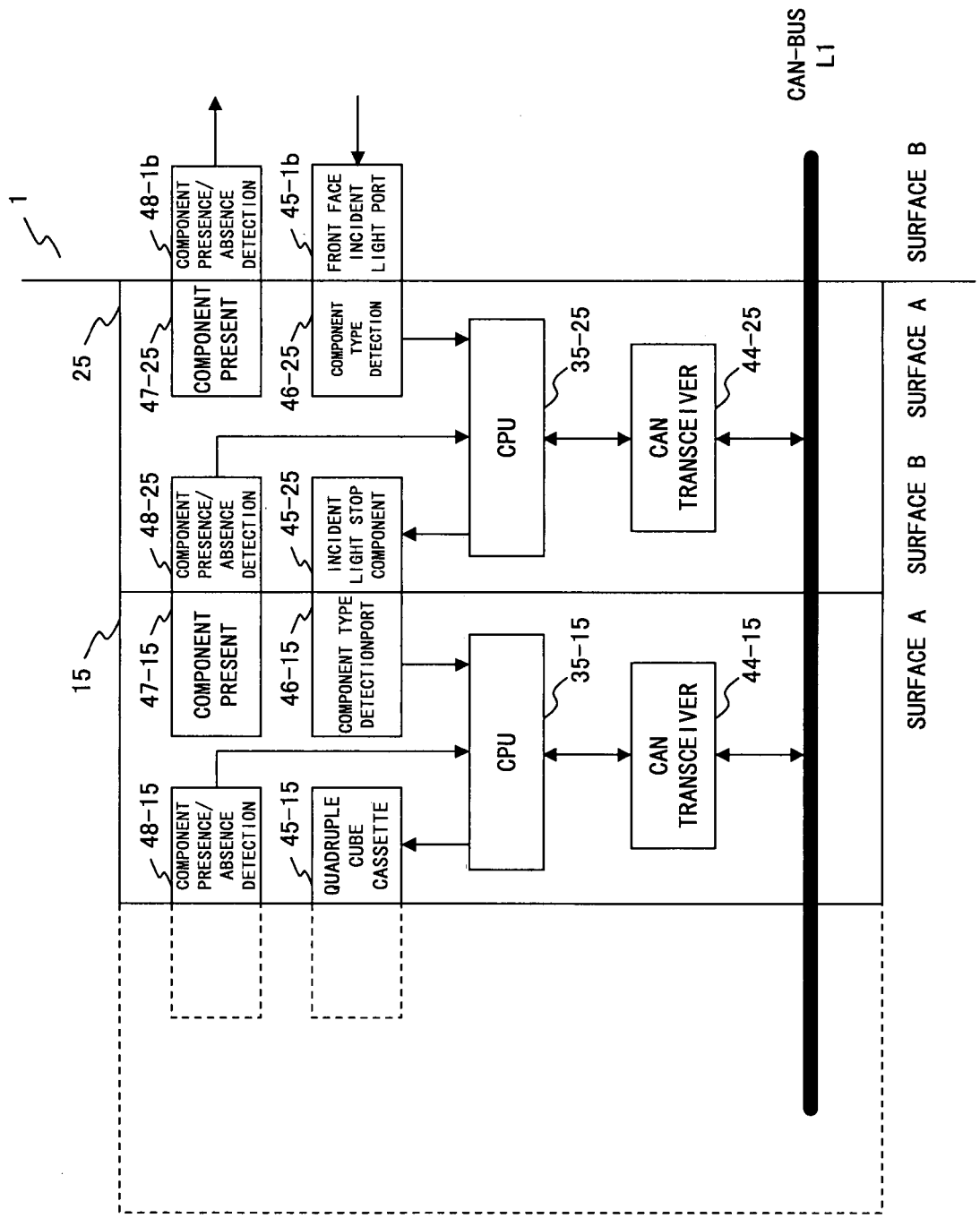
F I G. 11

MICROSCOPE-USE COMPONENT AND MICROSCOPE SYSTEM CONSTITUTED BY THE MICROSCOPE-USE COMPONENT

CROSS REFERENCE TO RELATED APPLICATION

This application is based on and claims the benefit of priority from the prior Japanese Patent Application No. 2006-175095 filed in Japan on Jun. 26, 2006, the entire contents of which are incorporated by this reference.

BACKGROUND OF THE INVENTION

1. Field of the Invention

The present invention relates to a microscope system allowing a motorized changeover of optical members necessary for various observations.

2. Description of the Related Art

Microscopes provide a diverse plurality of observation methods suitable to individual usages in the fields of medicine, biology, industries, et cetera. That is, a selection of optical elements necessary for observation methods employing bright field, dark field, differential interference, fluorescent, et cetera, enables a changeover among various observation methods.

Furthermore, such observation methods use a plurality of objective lenses, requiring many kinds of objective lenses, e.g., two to eight kinds, sometimes more, depending on the field of technique or the usage.

In an attempt to satisfy the diverse requirements effectively, component designs have been in progress for optical element changeover means for a microscope, e.g., revolver, cube cassette, filter turret, as components which are detachably attachable to a microscope. As a result, what is becoming a mainstream is so called a system microscope allowing an incorporation of a component selected for usage into a microscope, thereby obtaining the microscope with the number of changeover steps required for observations and the number of objective lenses (e.g., refer to a Laid-Open Japanese Patent Application Publication No. 2005-157340).

The Laid-Open Japanese Patent Application Publication No. 2005-157340 has disclosed a microscope using a Controller Area Network (CAN)-BUS system.

SUMMARY OF THE INVENTION

A microscope-use component according to the present invention is one constituting a microscope system and allowing an interconnection, comprising: a communication interface enabling a communication with a control apparatus of the microscope system by a prescribed communication system; a connection component-related information obtainment unit for obtaining connection component-related information that is information related to another microscope-use component from the connected other microscope-use component; and a control unit for transmitting, to a control apparatus of the microscope system by way of the communication interface, the connection component-related information of the other microscope-use component obtained by the connection component-related information obtainment unit and microscope-use component itself-related information that is information related to the present microscope-use component.

According to the present invention, a method for obtaining a relative connection relationship between microscope-use components constituting a microscope system comprises: interconnecting mutually connectable plural microscope-use components constituting the microscope system by using a communication interface enabling a communication with a control apparatus of the microscope system by a subscribed communication system; obtaining connection component-related information that is information related to another microscope-use component from the connected another microscope-use component; transmitting, to a control apparatus of the microscope system by way of the communication interface, the connection component-related information of the obtained other microscope-use component and component itself-related information that is information related to the present microscope-use component itself; and a relative connection relationship between the microscope-use components being obtained by the control apparatus of the microscope system based on the connection component-related information transmitted from each of the microscope-use components and the component itself-related information.

A microscope system according to the present invention is constituted by: plural mutually connectable microscope-use components; and a control apparatus for controlling each of the microscope-use components, wherein each of the microscope-use components comprises a communication interface enabling a communication with the control apparatus by a prescribed communication system, a connection component-related information obtainment unit for obtaining connection component-related information that is information related to another microscope-use component from the connected other microscope-use component, and a control unit for transmitting, to the control apparatus by way of the communication interface, the connection component-related information of the other microscope-use component obtained by the connection component-related information obtainment unit and microscope-use component itself-related information that is information related to the present microscope-use component itself.

BRIEF DESCRIPTION OF THE DRAWINGS

FIG. 6 exemplifies an electrical connection state between terminals P3a and P3b' according to the first embodiment (part 1);

FIG. 11 shows a connection state of components to the front incident light source port including a motorized cube cassette 15 shown in FIG. 1 according to the second embodiment.

DESCRIPTION OF THE PREFERRED EMBODIMENTS

Figure 1:
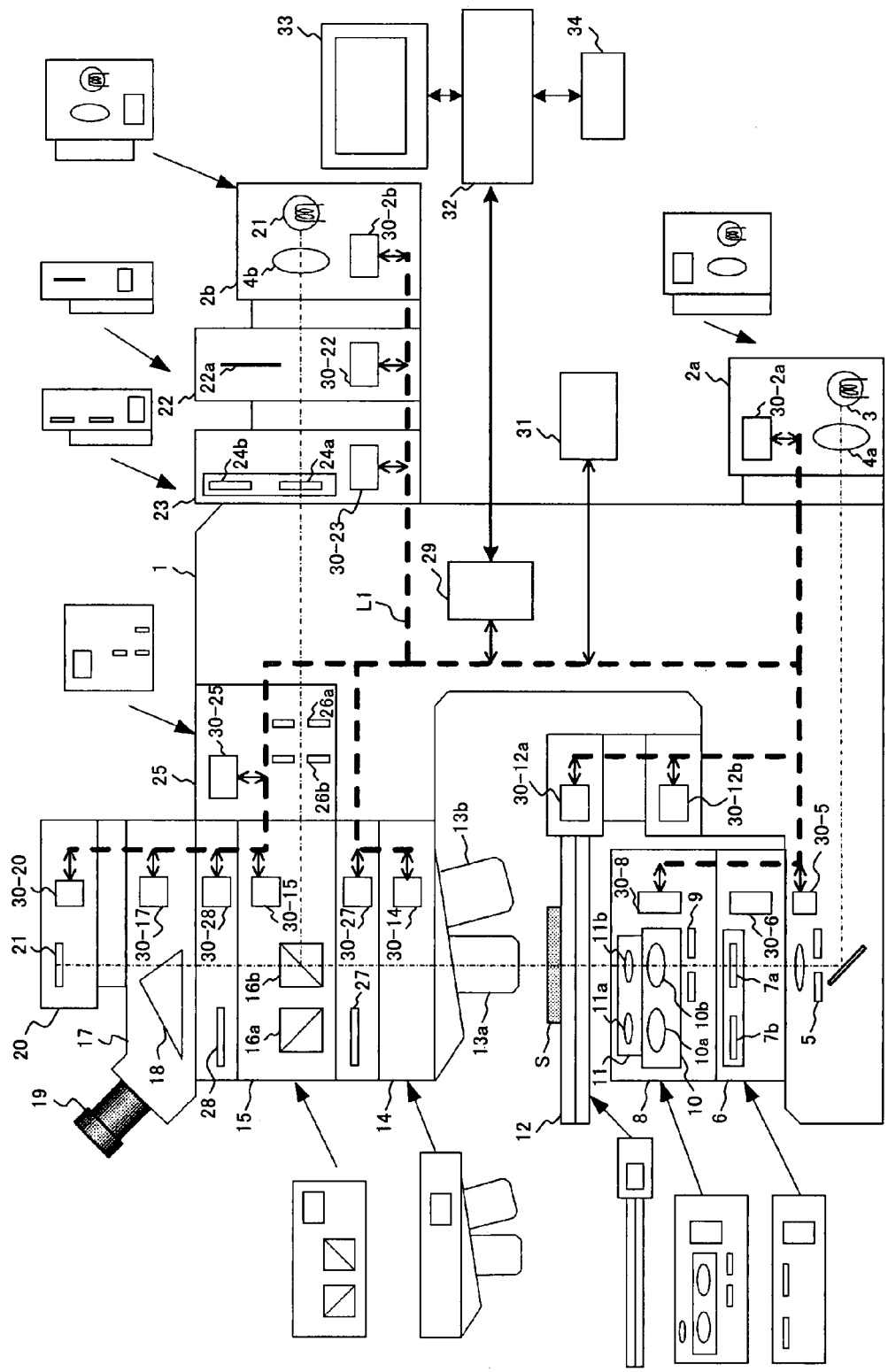
FIG. 1 shows a configuration of a microscope system according to the first preferred embodiment.

When a component is replaced in the conventional microscope, a freedom of microscope control is changed, also requiring a change in the control function in many cases. Therefore, if an optical element changeover component, such as a revolver with a different number of holes and a cube cassette with a different number of changeover steps, is mounted, and if the number of changeover of objective lenses and the number of changeover of observation methods are changed, the user has been required to change control functions and re-set a change of configurations anew. There has also been a problem of a wrong component being mounted in a system microscope apparatus with a high degree of freedom.

Furthermore, the above described system microscope has had to allow a large number of electrical connection-use cables being connected to each drive circuit from a microcomputer in the chassis of the microscope. This consequently has required a large space for harnessing the cables in the chassis of the microscope. This not only takes a lot of manual work in the assembly work but also is susceptible to an influence of electrical noise. Meanwhile, a circuit configuration of the system is largely fixed, thereby limiting a flexibility of the system configuration.

In the meantime, while the technique disclosed in the Laid-Open Japanese Patent Application Publication No. 2005-157340 enables a communication by a control unit and each component by an individual connection, an absence of connection between the components has precluded an obtainment of a relative positional relationship within a microscope system, that is, which component is connected to which component.

Preferred embodiments of the present invention described in the following provide a microscope-use component being superior in an extendability of a system, capable of suppressing the number of cables to a minimum, being superior in a noise resistance and minimizing a manual work in the assembly; and also provide a microscope system comprising the aforementioned microscope-use component.

First Embodiment

In the present embodiment, provided is a description on a microscope system, being built by detachably attachable plural motorized components and capable of obtaining a relative positional relationship between the components.

A microscope system can be built up by combining plural microscope-use components according to the present embodiment.

A microscope-use component comprises a communication interface, a connection component-related information obtainment unit and a control unit.

The communication interface (corresponding to terminals P1a and P1b of the CAN-BUS line L1 in accordance with the present embodiment) enables a communication with a control apparatus of the microscope system by means of a prescribed communication system (corresponding to the CAN-BUS system in accordance with the present embodiment).

The connection component-related information obtainment unit obtains connection component-related information that is information related to another microscope-use component from the connected another microscope-use component.

The connection component-related information obtainment unit is constituted by a component type information output unit and a component type information detection unit.

The component type information output unit (corresponding to a component type information output unit 45 in accordance with the present embodiment) outputs component type information that is information related to a type of the microscope-use component itself.

The component type information detection unit (corresponding to a component type information detection unit 46 in accordance with the present embodiment) detects component type information output from another microscope-use component.

The control unit (corresponding to a CPU circuit 35 in accordance with the present embodiment) is capable of transmitting, to the control apparatus of a microscope by way of the communication interface, the connection component-related information of another microscope-use component obtained by the connection component-related information obtainment unit and microscope-use component itself-related information that is information related to the present microscope-use component itself.

This configuration makes it possible to report the component type information of itself and that of the connection destination to the control apparatus of the microscope system. This configuration also makes it possible to obtain the component type information of the connection destination. This configuration also makes it possible to obtain the component type information of a microscope-use component connected to the front stage (such a component is sometimes simply noted as "front stage component" herein). This configuration also makes it possible to respond to a microscope system using the CAN communication system.

The microscope-use component further comprises a power supply interface. The power supply interface (corresponding to terminal P2a and P2b of a power supply line L2 in accordance with the present embodiment) receives a supply of power for driving the present microscope-use component itself.

This configuration makes it possible to supply the microscope-use component with the power. This configuration also makes it possible to build up a microscope system by combining plural microscope-use components.

Meanwhile, a method for obtaining a relative connection relationship between microscope-use components constituting a microscope system according to the present embodiment comprises interconnecting mutually connectable plural microscope-use components constituting the microscope system by using a communication interface enabling a communication with a control apparatus of the microscope system by a subscribed communication system; obtaining connection component-related information that is information related to another microscope-use component from the connected another microscope-use component; transmitting, to a control apparatus of the microscope system by way of the communication interface, the connection component-related information of the obtained other microscope-use component and component itself-related information that is information related to the present microscope-use component itself; and enabling the control apparatus to obtain a relative connection relationship between the microscope-use components based on the connection component-related information transmitted from each of the microscope-use components and the component itself-related information.

This configuration enables the control apparatus of the microscope system to grasp a relative connection relationship of each microscope-use component. Therefore, if a microscope-use component is exchanged, the control apparatus of the microscope system is enabled to recognize the exchanged microscope-use component and the position thereof correctly.

Now, the following is a description on the present embodiment.

FIG. 1 shows a configuration of a microscope system according to the present embodiment. In a microscope apparatus 1, the light emitted from a transmission illumination-use light source 3 constituted by a light emitting diode (LED), for example, within a lamp house 2a is collected by a collector lens 4a. The collected light is incident to a transmission-use filter turret 6, which is detachably attachable to the microscope body, by way of the transmission field stop 5.

Six kinds of filters, e.g., a neutral density (ND) filter 7a and a correction filter 7b, are mounted onto the transmission-use filter turret 6 so as to allow a changeover of them in six steps. The ND filter 7a is for dimming the brightness without changing a color temperature of the transmission illumination-use light source 3. The correction filter 7b is for carrying out a color correction. The transmission-use filter turret 6 allows a selective insertion and extraction of a discretionary filter into and out of the illumination optical system.

The illumination light transmitting through the transmission-use filter turret 6 illuminates an observation specimen S placed on a motorized stage 12 from underneath by way of a transmission-use aperture stop 9 within a condenser component 8, a condenser optical element component 10, and a condenser top lens component 11.

The condenser optical element component 10 is constituted by six kinds of condensers 10a through 10f (although the 10c through 10f are not shown in the drawing) allowing a selective insertion and extraction into and out of the light path. The condenser top lens component 11 is constituted by plural condenser top lenses 11a and 11b allowing a selective insertion and extraction into and out of the light path.

The motorized stage 12 is enabled to move the observation specimen S in two dimensions within a plane perpendicular to the light axis of the microscope and also move it upward and downward in the light axis direction for focusing.

Furthermore, above the motorized stage 12, a motorized revolver 14, which is enabled to change over six objective lens 13a through 13f (although the 13c through 13f are not shown in a drawing) in six stages is retained onto the bottom surface of an arm tip part (not shown in a drawing) of the microscope in a freely rotatably and detachably attachable fashion. A rotation of the motorized revolver 14 enables an insertion and extraction of a discretionary objective lens 13a through 13f into and out of the light axis within the observation light path.

Furthermore, a motorized cube cassette 15, being equipped on the arm tip part of the microscope apparatus 1, is placed on the light path of the observation light path in an exchangeable fashion. The motorized cube cassette 15, which is a four-stage changeover, turret type cube cassette mounting four kinds of filter cubes 16a through 16d (although 16c and 16d are not shown in a drawing), is enabled to selectively insert and extract a discretionary filter cube into and out of the light path in accordance with the individual observation method.

The light transmitting through either of the cubes 16a through 16d of the motorized cube cassette 15 is branched into two directions by a beam splitter 18 within an eye piece component 17, then one of the branched light is led to an eye piece lens 19 and the other light is led to an image pickup element 21 within the video camera 20.

The light emitted from an incident illumination-use light source 21 constituted by LED, halogen lamp, xenon lamp, or such, within a lamp house component 2b is collected by the collector lens 4b and incident to an incident light filter turret 23 which is exchangeable for the microscope apparatus 1.

The incident light filter turret 23 is enabled for a six-stage changeover and is equipped with six kinds of filters, such as ND filter 24a, correction filter 24b and such (although the 24c through 24f are not shown in a drawing). The incident light filter turret 23 is enabled to insert and extract a discretionary filter among the equipped filters selectively into and out of the light path. The ND filter 24a is for dimming the brightness of the incident illumination-use light source 21 without changing a color temperature. The correction filter 24b is for performing a color correction.

A motorized shutter component 22 having a shutter 22a for shutting off the light from the incident illumination-use light source 21 is placed on the previous stage of the incident light filter turret 23.

The light from the incident illumination-use light source 21 is led to and bend downward by the filter cube 16a inserted into the light path by way of the ND filter 24a, an incident aperture stop 26a and incident field stop 26b of a incident light stop component 25. The bent light is used for an incident light illumination of the observation specimen S by way of the objective lens 13a.

The observation light that is fluorescent light or reflection light from the incident light-illuminated observation specimen S is again branched by the beam splitter 18 after being led through the objective lens 13a and cube cassette 16a. One of the branched light beams is led to the eye piece lens 19 and the other is led to the image pickup element 21 within the video camera 20.

The front and rear of the motorized cube cassette 15 allows an insertion of a polarizer 27 and an analyzer 28 which are used for a differential interference observation and which are enabled to insert and extract into and out of the light path.

Each component (i.e., the lamp house components 2a and 2b, transmission-use filter turret 6, condenser component 8, motorized stage 12, motorized revolver 14, motorized cube cassette 15, eye piece component 17, video camera 20, motorized shutter component 22, incident light filter turret 23 and incident light stop component 25) is a constituent component insertable and extractable into and out of the microscope apparatus 1. And the microscope apparatus 1 is configured to allow an attachment of different kinds of components with a different number of optical elements and different control speeds for the optical element.

A microscope control unit 29 managing operations of the entirety including each component is connected to lamp house control units 30-2a and 30-2b, a transmission field stop control unit 30-5, a transmission-use filter turret control unit 30-6, a condenser component control unit 30-8, motorized stage control units 30-12a and 30-12b, a motorized revolver control unit 30-14, a motorized cube cassette control unit 30-15, an eye piece component control unit 30-17, a video camera control unit 30-20, a motorized shutter component control unit 30-22, an incident light-use filter turret control unit 30-23, an incident light field stop control unit 30-25, a polarizer control unit 30-27 and an analyzer control unit 30-28, respectively, by way of the CAN-BUS line L1. Therefore, the microscope control unit 29 is enabled to control the control units of these components by means of command communications.

The lamp house control units 30-2a and 30-2b perform drive controls of the transmission illumination-use light source 3 and incident illumination-use light source 21, respectively, by means of communication controls of the microscope control unit 29. The transmission field stop control unit 30-5 performs the drive and control of the motorized transmission field stop 5.

The transmission-use filter turret control unit 30-6 and incident light-use filter turret control unit 30-23 perform the drive and control of the respectively built-in transmission filters 7a through 7f and incident light filters 24a through 24f by controls of the microscope control unit 29 by means of communications.

The condenser component control unit 30-8 performs the drive and control of condenser optical element components 10a through 10f, condenser top lens component 11 and transmission-use aperture stop 9.

The motorized stage control unit 30-12a performs the drive control and coordinate management of the motorized stage 12 in the X-Y direction. The motorized stage control unit 30-12b performs the drive control and coordinate management of the motorized stage 12 in the Z direction (i.e., the light axis direction).

The motorized stage control unit 30-12b also is in charge of the drive control of the motorized stage for performing a so called focusing operation for the observation specimen S, which is carried out at the microscope control unit 29 based on information of the video camera 20.

The motorized revolver control unit 30-14 and motorized cube cassette control unit 30-15 performs the drive and control of the motorized revolver 14 and motorized cube cassette 15, respectively. The eye piece component control unit 30-17 is for performing the drive control of the beam splitter 18, thereby changing the light volume ratio of the two-way split light.

The video camera control unit 30-20 performs the control of the video camera 20 for photographing a still image and video image data of the observation specimen S. The video camera control unit 30-20 also has the function of transferring photographed image data of the observation specimen S to the host system 32 by way of the microscope control unit 29.

The motorized shutter component control unit 30-22 performs the drive control of the shutter 22a shutting off the light path. The incident light field stop control unit 30-25 performs the drive and control of the incident aperture stop 26a and incident field stop 26b.

The polarizer control unit 30-27 and analyzer control unit 30-28 performs respective drive controls for inserting and extracting the polarizer and analyzer into and out of the light path.

The microscope apparatus 1 is further connected to a host system 32 by way of the microscope control unit 29. The host system 32 is just a commonly configured computer comprising: a central processing unit (CPU) managing the control of the operation of the entire microscope system by the execution of a control program; the main memory user by the CPU as work memory on an as required basis; an input apparatus 34, such as a mouse and key board, for obtaining a series of instructions from a user; and an auxiliary storage apparatus such as a hard disk for storing various program and data. A display apparatus 33 of the host system 32 is enabled to display various pieces of control information of the microscope apparatus 1.

The input apparatus of the host system 32 is enabled to input and set up various data related to controlling the microscope apparatus 1. Furthermore, a microscope control unit 31 connected to the CAN-BUS system is also enabled for an input of various pieces of data and various operation which are related to the control of the microscope apparatus 1.

The microscope control unit 29 is further connected to the motorized stage control unit 30-12a for controlling the motorized stage 12 in the X-Y direction and to the motorized stage control unit 30-12b for controlling it in the light axis direction (i.e., the Z direction), thereby enabling also the control of the motorized stage 12.

Likewise a function of the host system 32, the microscope control unit 31 is a hand switch comprising various input units for inputting operation instruction of the microscope apparatus 1, also enabling the operation of the motorized stage 12 by means of a joy stick or encoder (either of which is not shown in a drawing herein) comprised by the hand switch.

That is, the microscope control unit 29 has the function of controlling the operation of the entirety of the microscope apparatus 1. In other words, the microscope control unit 29 has the functions of changing observation methods and adjusting the light of the transmission illumination-use light source and incident illumination-use light source by performing the communication control of each component in accordance with the control signal from the host system 32.

Figure 2:
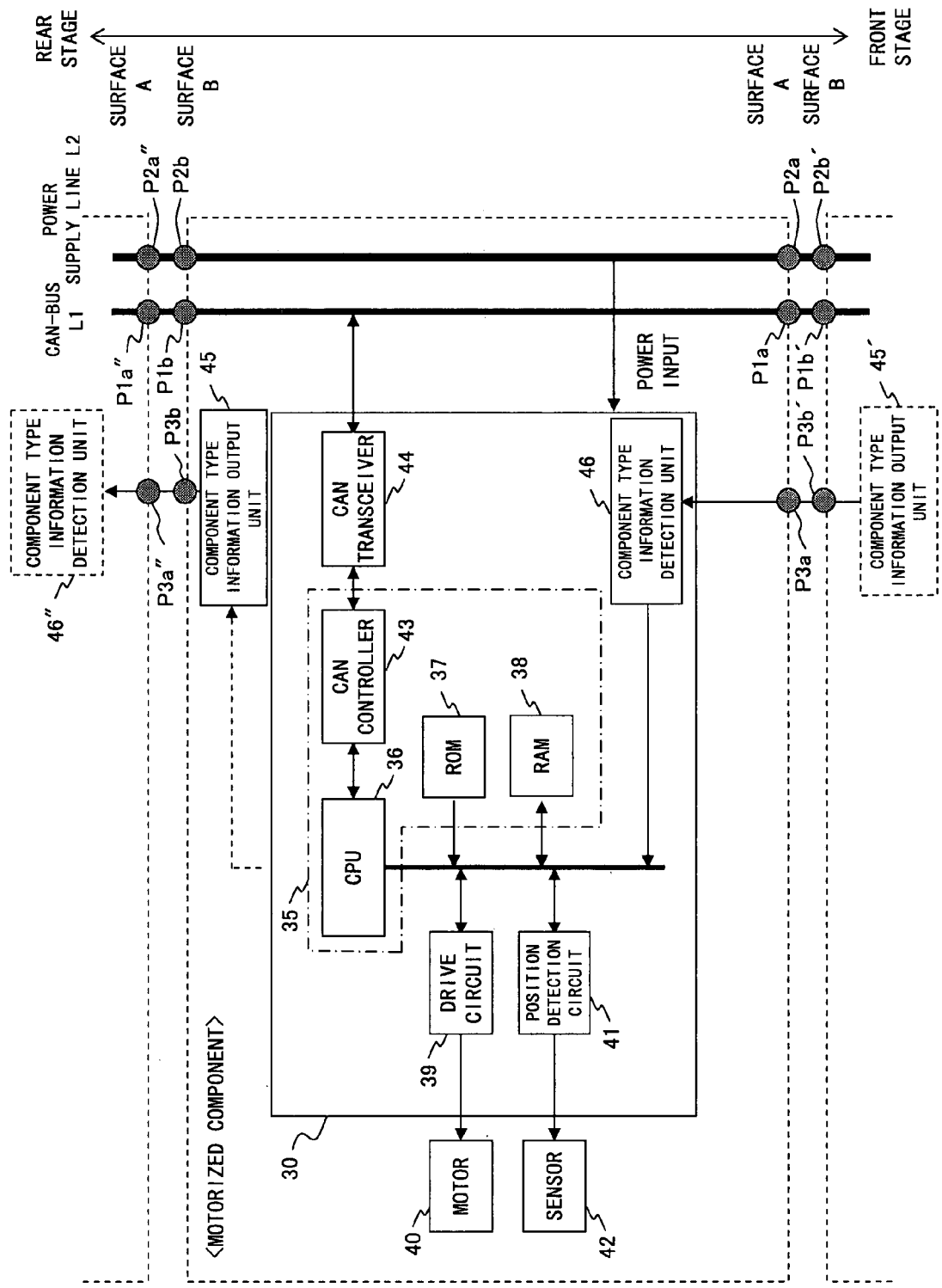
FIG. 2 shows a circuit configuration of each motorized component according to the first embodiment.

FIG. 2 shows a circuit configuration of each motorized component according to the present embodiment. Note that the present embodiment is described by attaching an apostrophe (') to the component sign related to a component existing at the front stage of the focused component and a double apostrophe ('') to the component sign related to a component existing at the rear stage of the focused component.

As shown in FIG. 2, the mounting surface of each component is attached with the terminals P1a and P1b of the CAN-BUS line L1 and the junction terminals P2a and P2b of the power supply line L2. And the configuration is such that joining the components electrically connects the CAN-BUS line L1 to the power supply line L2.

Each motorized component is built in with a control unit 30, a motor 40, a sensor 42 and a component type information output unit 45. The respective control units 30 of the motorized components comprise a circuit configuration shown in FIG. 2. That is, each control unit 30 internally comprises a CPU circuit 35, a drive circuit 39, a position detection circuit 41, a CAN-BUS-use CAN transceiver 44, a component type information detection unit 46 and other peripheral circuit(s) (not shown in a drawing).

The drive circuit 39 drives optical components connected to a motor 40 as a subject of control in accordance with an instruction from the CPU circuit 35. The position detection circuit 41 detects a position of the optical component as a subject of control by using a sensor 42 and reports it to the CPU circuit 35.

The CPU circuit 35 comprises a CPU 36, Flash ROM 37, RAM 38 and a CAN controller 43. The CPU 36, Flash ROM 37 and RAM 38 are interconnected by way of a CPU bus. The Flash ROM 37 stores a program describing various control contents. The RAM 38 stores control arithmetic operation-use data.

The CPU 36 is enabled for a communication with the microscope control unit 29 by way of the CAN-BUS-use CAN controller 43 and CAN transceiver 44, and of the CAN-BUS line L1.

Therefore, when a control instruction by a command from the microscope control unit 29 is sent to each control unit 30 by way of the CAN-BUS line L1, the CPU 36 operates in accordance with a program stored in the ROM 37 so that the CPU 36 executes the control of the respectively responsible optical component and such.

The lamp houses 2a and 2b as ones of the components drive the light source in place of driving a motor. The video camera 20 as one of the components performs the drive control of the image pickup elements.

Meanwhile, in the joining surface of each component, a detection terminal P3a used for the component type information detection unit 46 is placed on the joining surface A on the microscope control unit 29 side, and a terminal P3b used for the component type information output unit 45 is placed on the joining surface B on the opposite side.

The component type information output unit 45 outputs which component the present component itself is to a component connected to the rear stage (such a component is sometimes simply noted as "rear stage component" herein). The component type information output unit 45 is for example a digital output unit outputting a high level and low level of an eight-bit signal in a common digital signal (refer to FIG. 6).

The component type information detection unit 46 is used for detecting component type information output from the component type information output unit 45' on the front stage. Therefore, when a pair of components is joined, the P3a terminal is electrically connected to the P3b' terminal of the component on the front stage. This prompts the component type information detection unit 46 to detect component type information from the component type information output unit 45' on the front stage by way of the P3a and P3b' terminals, and send the information to the CPU circuit 35.

The CPU circuit 35 further comprises the function of transmitting the component type information of the present component itself and the component type information of the front stage detected by the component type information detection unit 46 by way of the CAN-BUS line L1 based on the command instruction from the microscope control unit 29.

Figure 3:
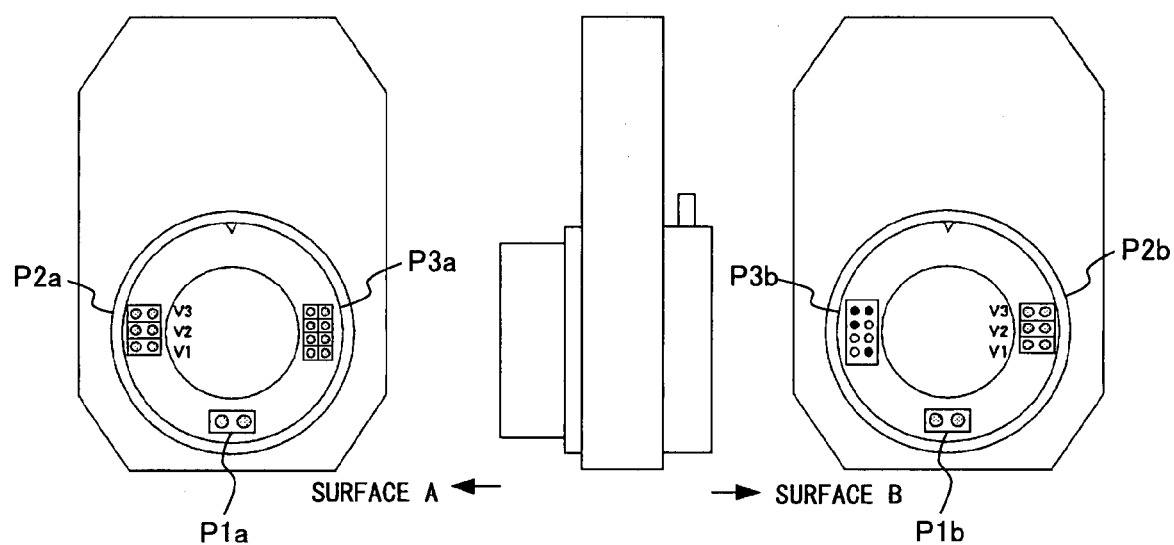
FIG. 3 shows a physical connection state between motorized components according to the first embodiment.

FIG. 3 shows a joining part for enabling a physical connection between motorized components according to the present embodiment. FIG. 3 exemplifies a configuration of the filter turret 23. The P1a is a terminal for electrically connecting a component on the front stage (i.e., the P1b' terminal of the front stage component) to the CAN-BUS line L1 at the time of joining the component. The P1b is a terminal for electrically connecting a component on the rear stage (i.e., the P1a" terminal of the rear stage component) to the CAN-BUS line L1.

The P2a is a terminal for electrically connecting a component on the front stage (i.e., the P2b' terminal of the front stage component) to the power supply line L2 at the time of joining the component. The P2b is a terminal for electrically connecting a component on the rear stage (i.e., the P2a" terminal of the rear stage component).

Furthermore, the V1, V2 and V3 of the P2a and P2b are defined that the respective V1s are the power supply lines for logic circuits the V2s are lines for motors and the V3s are for the power supply lines for light sources.

The next is a description on an operation of the microscope system.

Figure 4:
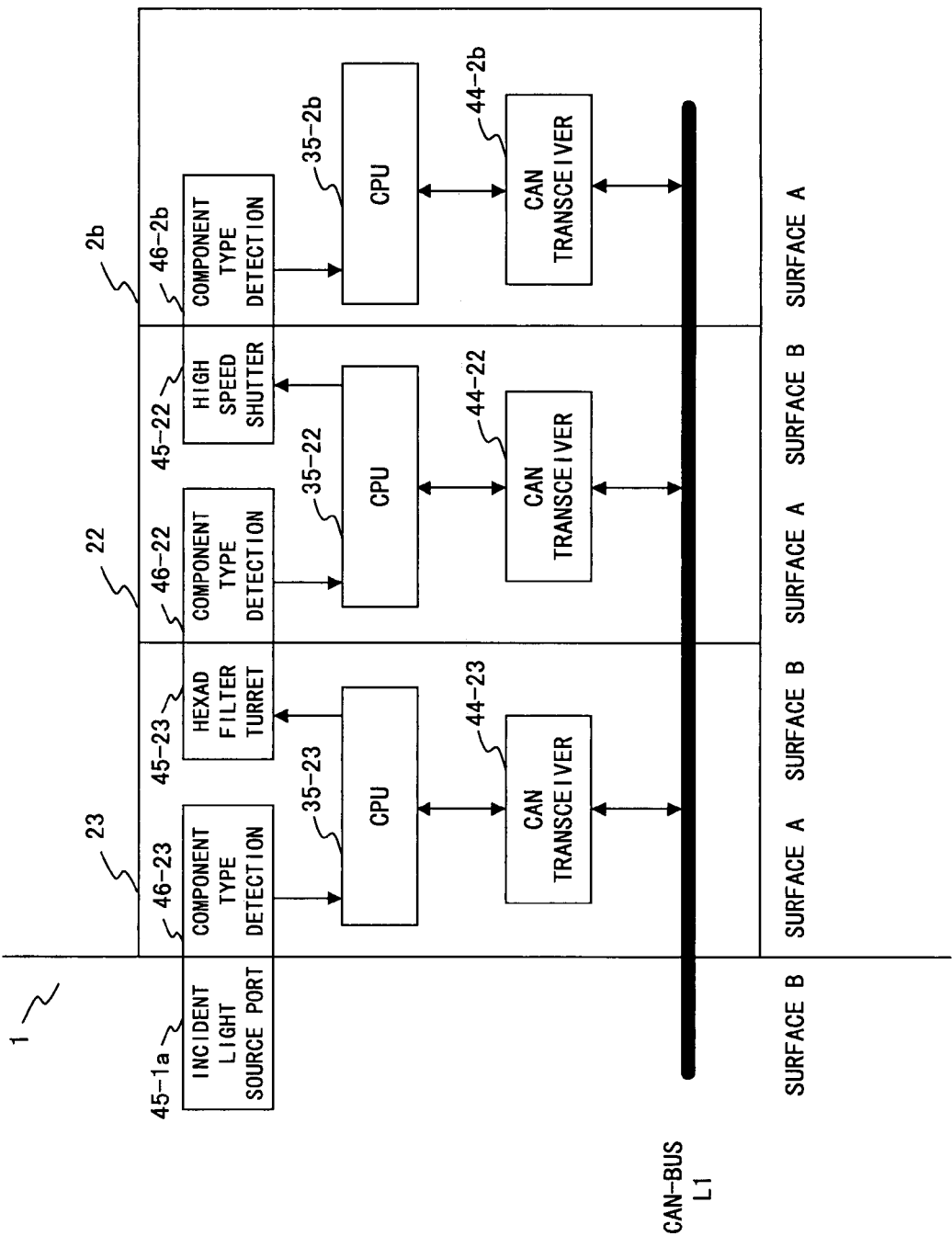
FIG. 4 shows a connection state of components on an incident light source port according to FIG. 1.

FIG. 4 shows a connection state of components on an incident light source port according to FIG. 1. From the incident light source port side of the microscope apparatus 1, the hexad filter turret 23, motorized shutter component 22 and LED lamp house component 2b are connected according to the configuration shown in FIG. 4.

To begin with, the microscope control unit 29 transmits a command instruction to all of the motorized components connected to the CAN-BUS line L1 for inquiring a connection state. Having received the command instruction, the CPU 35-23 of the hexad filter turret 23 makes the component type information detection unit 46-23 detect information (i.e., component type information) of the component type information output unit at the incident light source port 45-1a of the microscope apparatus 1 and judges the fact that "the component connected to the present component itself is the incident light source port 45-1a of the microscope apparatus 1".

Having finished the detection of the component on the front stage connected to the present component itself, the CPU circuit 35-23 responds back to the microscope control unit 29 with a message that "the present component itself is the hexad filter turret 23 and is connected to the incident light source port 45-1a".

Likewise, having received an inquiry of a connection state, the motorized shutter component 22 makes the component type information detection unit 46-22 detects component type information output from the component type information output unit 45-23 of the hexad filter turret 23 on the front stage to which the present component itself is connected, and responds back to the microscope control unit 29 with a message that "the present component itself is the motorized shutter component 22 and is connected to the hexad filter turret 23".

Likewise the LED lamp house component 2b responds back to the microscope control unit 29 with a message that "the present component itself is the LED lamp house component 2b and is connected to the motorized shutter component 22".

Having received these responses, the microscope control unit 29 is enabled to recognize the fact that the components are connected to the incident light source port 45-1a in the sequence of the incident light source port 45-1a, hexad filter turret 23, motorized shutter component 22 and LED lamp house component 2b.

Figure 5:
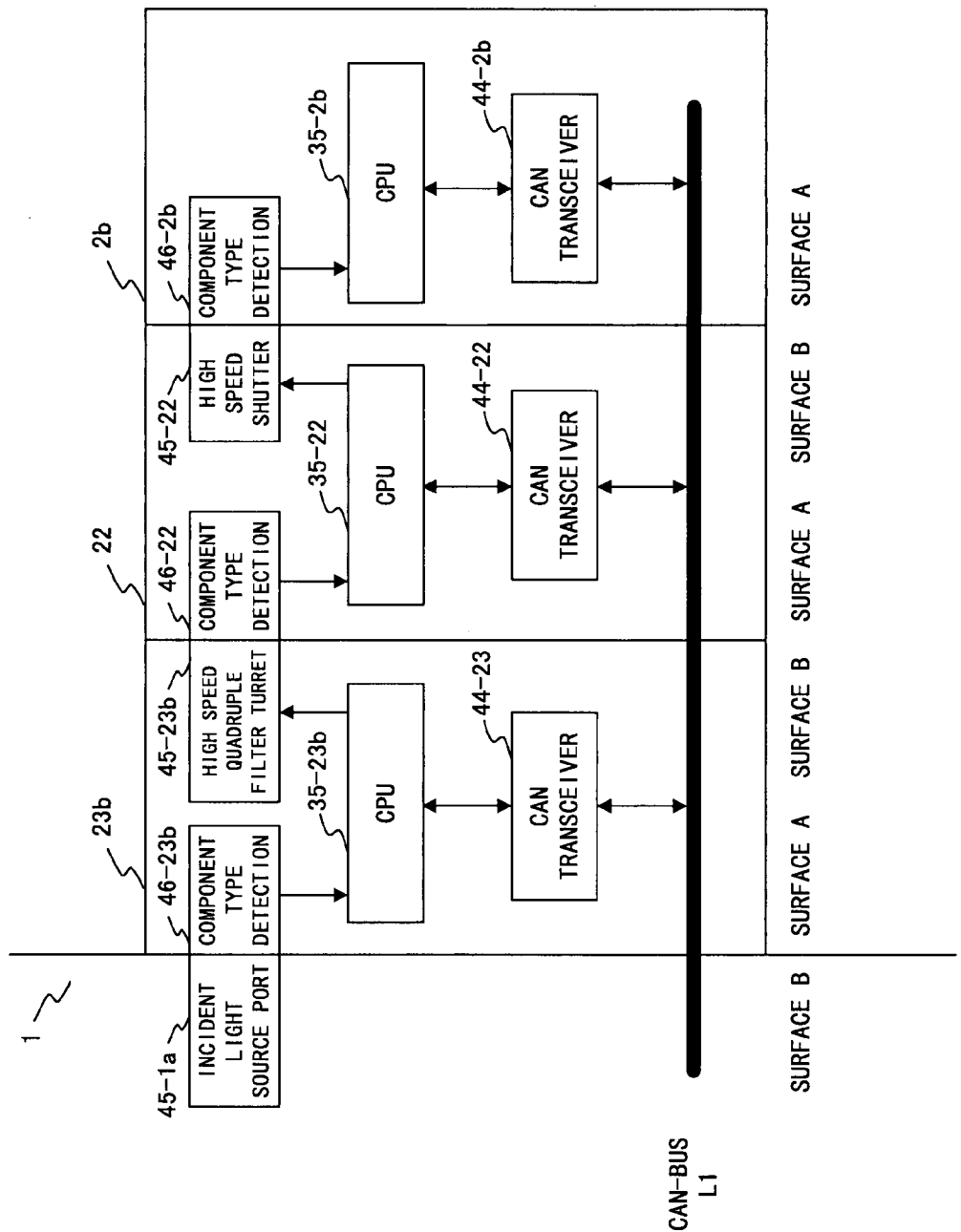
FIG. 5 shows a connection state between components in which a hexad filter turret 23 shown in FIG. 4 is changed to a quadruple high-speed filter turret 23b.

The next is a description on the case of changing the hexad filter turret 23 to a quadruple high speed filter turret 23b as shown in FIG. 5.

FIG. 5 shows a connection state between components in which a hexad filter turret 23 shown in FIG. 4 is changed to a quadruple high-speed filter turret 23b. When the hexad filter turret 23 is changed to the quadruple high speed filter turret 23b, the microscope control unit 29 transmits an instruction to each motorized component connected to the CAN-BUS line L1 inquiring a connection state of the component.

Having received the instruction, the CPU circuit 35-23b of the quadruple high speed filter turret 23b makes the component type information detection unit 46-23b obtain information (i.e., component type information) of the component type information output unit at the incident light source port A of the microscope apparatus 1, and the CPU circuit 35-23b detects the fact that "the component to which the present component itself is connected is the incident light source port 45-1a of the microscope apparatus 1".

Having finished the detection of the component to which the component is connected, the CPU circuit 35-23b responds back to the microscope control unit 29 with a message that "the present component itself is the quadruple high speed filter turret 23b and is connected to the incident light source port 45-1a of the microscope apparatus 1.

Having likewise received the inquiry of a connection state, the CPU circuit 35-22 of the motorized shutter component 22 makes the component type information detection unit 46-22 detect component type information output from the component type information output unit 45-23b of the quadruple high speed filter turret 23b on the front stage to which the present component itself is connected and responds back to the microscope control unit 29 with a message that "the present component itself is the motorized shutter component 22 and is connected to the quadruple high speed filter turret 23b".

Likewise, the LED lamp house component 2*b* also responds back to the microscope control unit 29 with a message that "the present component itself is the LED lamp house component 2*b* and is connected to the motorized shutter component 22".

Having received these responses, the microscope control unit 29 is enabled to recognize the fact of the component being connected to the incident light source port 45-1*a* in the sequence of the incident light source port 45-1*a*, the quadruple high speed filter turret 23*b*, the motorized shutter component 22 and LED lamp house component 2*b*.

This configuration enables the recognition of an exchanged component and the position without a user inputting anew and an interconnected control based on the information.

Figure 7:
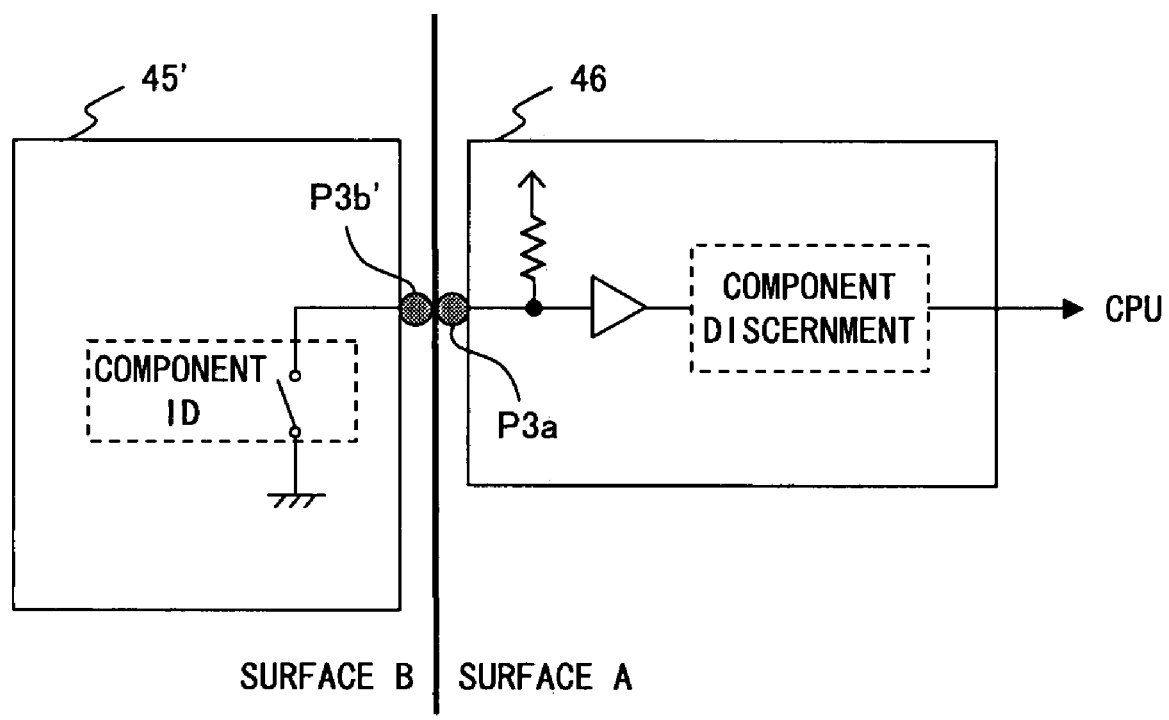
FIG. 7 exemplifies an electrical connection state between terminals P3a and P3b' according to the first embodiment (part 2)
Figure 8:
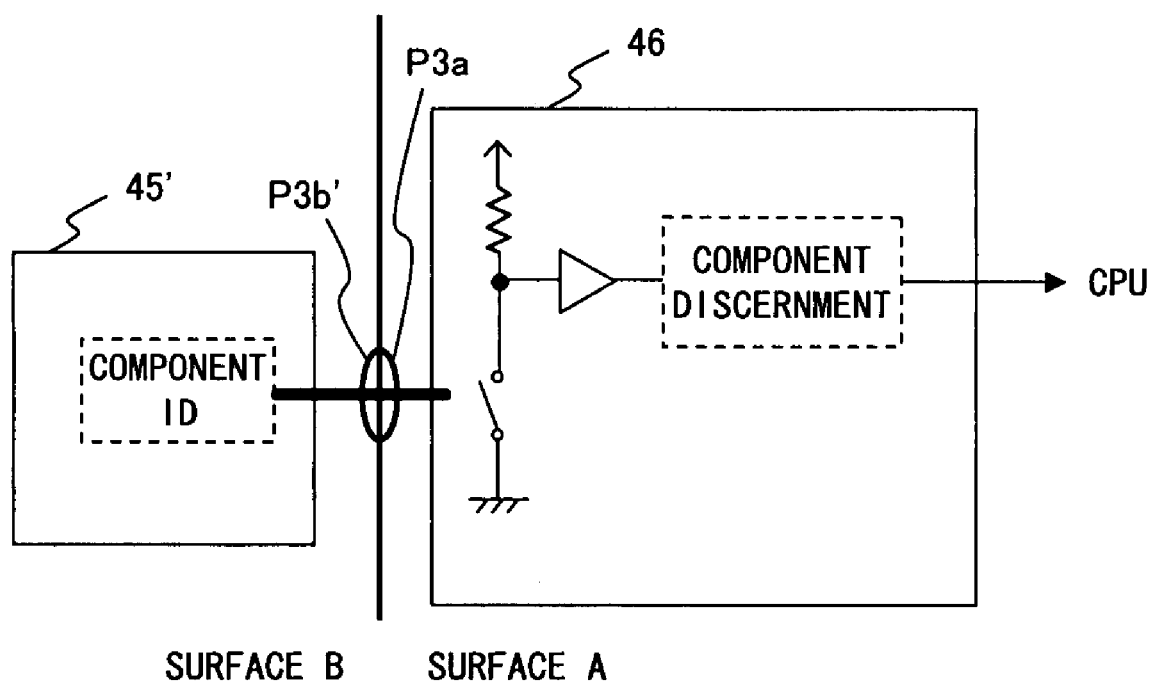
FIG. 8 exemplifies an electrical connection state between terminals P3a and P3b' according to the first embodiment (part 3)

The next is a description on a variation of embodiments of the component type information output unit 45 and component type information detection unit 46 by referring to FIGS. 6 through 8.

FIG. 6 exemplifies an electrical connection state between terminals P3*a* and P3*b*' according to the present embodiment (part 1). The component type information output unit 45' may be for example a digital output unit outputting a high level and a low level of eight-bit signal in a common digital signal.

The component type information output unit 45' is enabled by the control of the CPU 35' to output a component ID (i.e., component type information to the component type information detection unit 46 by way of the terminals P3*a* and P3*b*'.

FIG. 7 exemplifies an electrical connection state between terminals P3*a* and P3*b*' according to the first embodiment (part 2). For FIG. 6, a discernment of a component has been described as an eight-bit electric signal; an alternative configuration, however, may be such that the discernment is to detect the On or Off of a dip switch which is set by a user as shown in FIG. 7, in lieu of being limited as described above.

FIG. 8 exemplifies an electrical connection state between terminals P3*a* and P3*b*' according to the first embodiment (part 3). An alternative configuration may be to discern component information by the On or Off of the switch at the time of component making contact as shown in FIG. 8.

Also, in lieu of being limited to the configurations of FIGS. 6 through 8, it may be possible to use ROM as the component type information output unit 45 and a reader for the ROM as the component type information detection unit 46 so as to read information from the ROM at the time of joining components. Further alternatively possible is a use of a Field Programmable Gate Array (FPGA), in lieu of using a dip switch, for pre-setting the On/Off.

As to the component type information output unit 45 and component type information detection unit 46, various applications are available in view of obtaining information of joined components when they are jointed together as described above.

Moreover, the present embodiment has been described for the case of the CAN-BUS line, power supply line and component type detection being equipped on the component joining surface; a part of components, however, may apparently be connected to an external cable.

As described above, the microscope system according to the present embodiment is configured to have the CAN-BUS line, power supply line and component recognition code on the component connection surface. Such a configuration makes it possible to ease an exchange of components, improve an extendability of a system and recognize the configuration and mounting position of the component. Therefore, it enables a control of interconnected operation without a user setting the configuration and mounting position of the component anew, thereby making it possible to reduce a load on the user greatly.

Second Embodiment

The present embodiment is described on a microscope system capable of further transmitting, to the microscope control unit 29, information on a presence or absence of another component being set at the rear stage of the present component itself, for each component, in addition to the first embodiment. Note that the same component sign is assigned to the same configuration as the first embodiment and the description is omitted in the description of the present embodiment.

The present embodiment is configured to further comprise a connection component detection unit in addition to the comprisal of the first embodiment. The connection component detection unit (corresponding to a component presence/absence information output unit 47 and a component presence/absence information detection unit 48 according to the present embodiment) detects whether or not the other microscope-use component is connected to the present microscope-use component itself. The control unit (corresponding to a CPU circuit 35 according to the present embodiment) is enabled to transmit a change in connection states between the present microscope-use component itself and another microscope-use component based on the detection result of the connection component detection unit.

Such a configuration makes it possible to detect whether or not the other microscope-use component is connected to the present microscope-use component itself. Such a configuration also makes it possible to report a change occurring in a connection state between components to the control apparatus of the microscope system when the change occurs. Such a configuration also makes it possible to report an event of a component connected to the rear stage being removed to the control apparatus of the microscope system when the event occurs.

In a microscope system configured by combing the microscope-use components, if the light beam of a light source is externally leaked by a release of a connection when receiving information of the event of releasing the connection between the microscope-use components, the control apparatus of the microscope system is capable of performing a control of shutting off the light beam from the light source or turning it off.

Such a configuration makes it possible to prevent an unnecessary light beam from externally leaking.

Now a detailed description of the present embodiment is put forth in the following.

Figure 9:
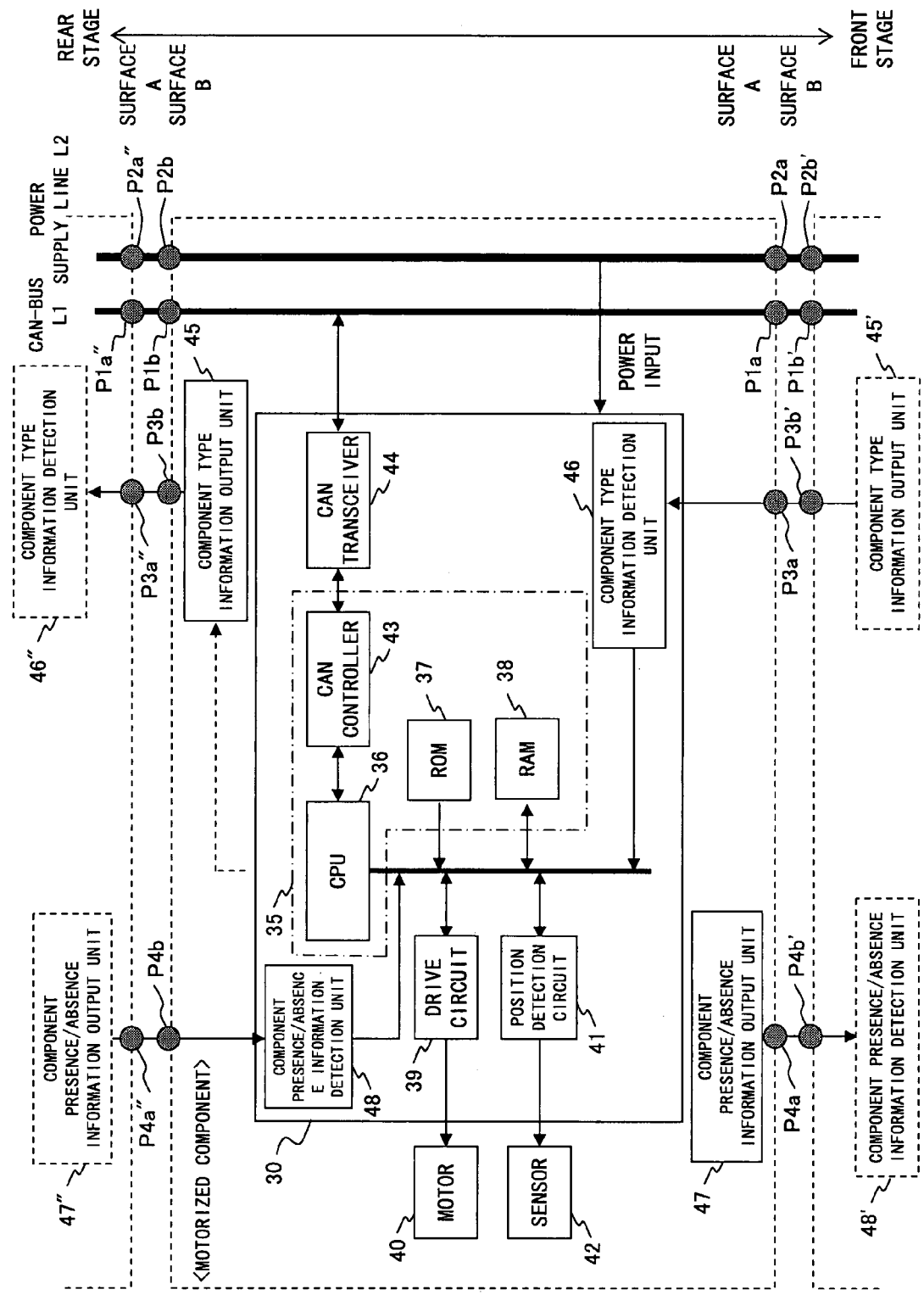
FIG. 9 shows a circuit configuration of each motorized component according to the second embodiment.

FIG. 9 shows a circuit configuration of each motorized component according to the present embodiment. Note that the present embodiment is described by attaching an apostrophe (') to the component sign related to a component existing at the front stage of the focused component and a double apostrophe ('') to the component sign related to a component existing at the rear stage of the focused component.

Likewise the first embodiment, each motorized component is built in with the control unit 30, motor 40, sensor 42 and component type information output unit 45, and, in addition, the component presence/absence information output unit 47.

The control unit of each component internally comprises a CPU circuit 35, a drive circuit 39, a position detection circuit 41, a CAN-BUS-use CAN transceiver 44, a component type information detection unit 46, a component presence/absence information detection unit 48 and other peripheral circuit(s) (not shown in a drawing herein).

The drive circuit 39 drives an optical component connected to a motor 40, as a subject of control based on an instruction from the CPU circuit 35. The position detection circuit 41 detects a position of an optical component as a subject of control from the sensor 42 and reports it to the CPU circuit 35.

The CPU 36 is enabled to communicate with the microscope control unit 29 from the CAN-BUS-use CAN controller 43 and CAN transceiver 44 by way of the CAN-BUS line L1. When a control instruction is sent from the microscope control unit 29 to each control unit 30 by way of the CAN-BUS line L1, the CPU 36 operates in accordance with the program stored in the ROM 37, thereby a control of the optical component for which the control unit is responsible being carried out.

Likewise the first embodiment, a detection terminal P3a used for the component type information detection unit 46 is placed on the joining surface A on the microscope control unit 29 side, and terminal P3b used for the component type information output unit 45 is placed on the joining surface B on the other side, both on the joining surface of each component.

The component type information output unit 45 outputs information (i.e., component type information) as to which component the present component itself is to the component connected to the rear stage. When a pair of components is joined, the terminal P3a is electrically connected to the terminal P3b' of the front stage component. This prompts the component type information detection unit 46 to send the component type information output from the component type information output unit 45' at the front stage to the CPU circuit 35 by way of the terminals P3a and P3b'.

Furthermore, a terminal P4a used for the component presence/absence information output unit 47 which outputs, to the front stage component, information of the fact of the present component itself being connected is placed on the joining surface A on the microscope control unit 29 side, and a terminal P4b used for the component presence/absence information detection unit 48 which detects whether a component is connected at the rear stage is placed on the joining surface B on the reverse side, both on the joining surface of each component.

The component presence/absence information output unit 47 is configured to output, to the component connected at the front stage, information indicating the fact of the present component itself being connected. As an example, the component presence/absence information output unit 47 outputs a ground (GND) level in a digital signal when a component is joined, as shown in FIG. 10.

The component presence/absence information detection unit 48 is configured to detect information of a presence/absence of a component at the rear stage from an output from the component presence/absence information output unit 47" at the rear stage. Therefore, when the components are joined, the terminal P4b is electrically connected to the terminal P4b" of the rear stage component. This prompts the component presence/absence information detection unit 48 to detect the component presence/absence information output from the component presence/absence information output unit 47" by way of the terminals P4a" and P4b and send it to the CPU circuit 35.

The CPU circuit 35 further comprises the function of transmitting information as to whether a component is connected to the rear stage to the microscope control unit 29 by way of the CAN-BUS line L1.

Figure 10:
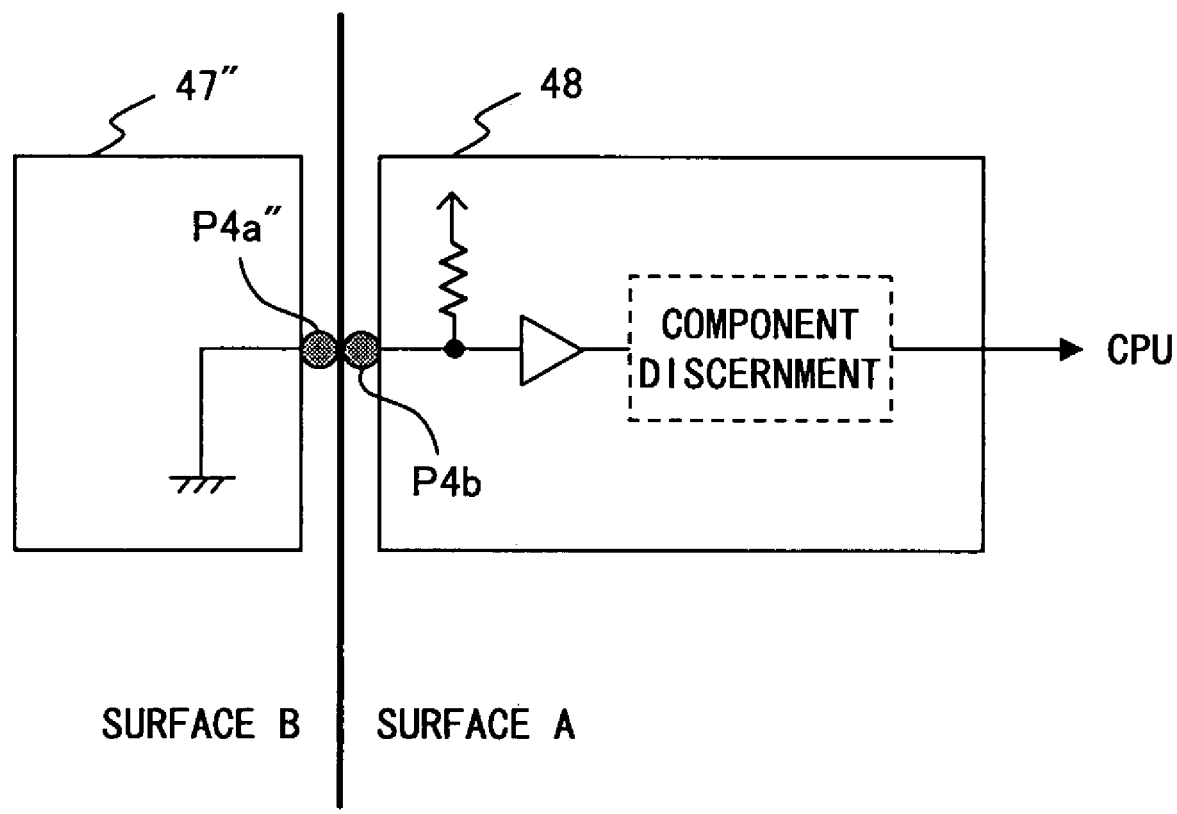
FIG. 10 exemplifies an electrical connection state between terminals P4a and P4b" according to the second embodiment.

FIG. 10 exemplifies an electrical connection state between terminals P4a and P4b" according to the present embodiment.

As shown in FIG. 10, the component presence/absence information output unit 47" outputs a GND level in a digital signal to the component presence/absence information detection unit 48 if a component is joined. Then, when the component is removed, a High level digital signal is detected at the component presence/absence information detection unit 48. This configuration makes it possible to detect whether or not a component is connected at the rear stage.

The next is a description on an operation of the microscope system.

FIG. 11 shows a connection state of components to the front incident light source port including a motorized cube cassette 15 shown in FIG. 1 according to the present embodiment. The incident light stop component 25 and motorized cube cassette 15 are connected starting from the front face incident light source port side of the microscope apparatus 1 in the configuration of FIG. 11.

The microscope control unit 29 transmits a command instruction to a motorized component connected to the CAN-BUS line L1 for inquiring a connection state. Having received the instruction, the incident light stop component 25 makes the component type information detection unit 46-25 obtain component type information from the front face incident light source port 45-1b of the microscope apparatus 1 and detects the fact that "the component to which the present component itself is connected is the front face incident light source port 45-1b of the microscope apparatus 1". Having finished the detection of the component to which the present component itself is connected, the CPU circuit 35-25 responds back to the microscope control unit 29 with a message that "the present component itself is the incident light stop component 25 and is connected to the front face incident light source port 45-1b of the microscope apparatus 1".

The incident light stop component 25 further detects the fact of a component being connected at a rear stage from the component presence/absence information detection unit 48-25 because the motorized cube cassette 15 is connected at the rear stage.

Likewise, having received the inquiry on a connection state, the motorized cube cassette 15 responds back to the microscope control unit 29 with a message that. "the present component itself is the motorized cube cassette 15 and is connected to the incident light stop component 25" based on the output of the component type information output unit 45-25 of the incident light stop component 25 at the front stage to which the present component itself is connected.

Having received these responses, the microscope control unit 29 is enabled to recognize the fact of components being connected to the front face incident light source port 45-1b in the sequence of the front face incident light source port 45-1b, incident light stop component 25 and motorized cube cassette 15.

The next is a description of the case of the motorized cube cassette 15 being removed from FIG. 11.

Figure 12:
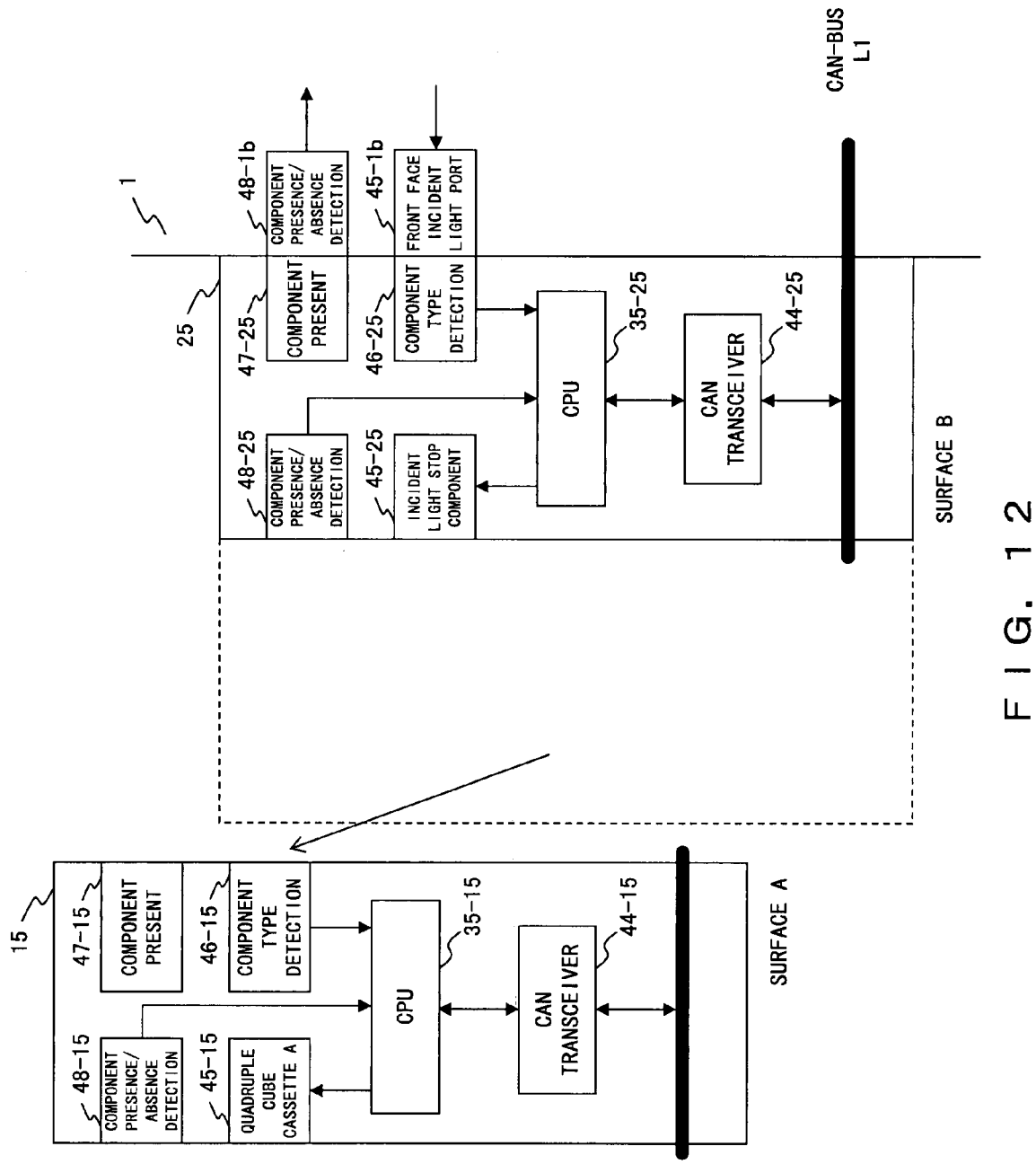
FIG. 12 shows a state of the motorized cube cassette 15 being removed from FIG. 11.

FIG. 12 shows a state of the motorized cube cassette 15 being removed from FIG. 11. When the motorized cube cassette 15 is removed, the component presence/absence information detection unit 48-25 of the incident light stop component 25 detects the event of a component at the rear stage being removed. The CPU circuit 35-25 of the incident light stop component 25 immediately transmits the information of the component at the rear of the incident light stop component 25 to the microscope control unit 29 by way of the CAN-BUS.

Having received the information, the microscope control unit 29 immediately performs a drive control of the optical element for each component. That is, the microscope control unit 29 transmits an instruction to the motorized shutter component 22 for closing the shutter 22a so as to shut off the incident light beam for preventing the light of the incident light source from externally leaking. If the motorized shutter component 22 does not exist, the microscope control unit 29 controls the incident light source 2b so as to shut off the light source.

Likewise, if another component is removed, the microscope control unit 29 immediately performs a drive control so as to maintain the microscope in the most optimal state corresponding to the position of the removed component.

As described above, the microscope system according to the present embodiment is configured to comprise the component presence/absence information detection unit on the connection surface of the component, thereby enabling the microscope control unit 29 to obtain the information of an event immediately even if a component is unreadily removed. Therefore, it is possible to perform a drive control in accordance with the removed component.

Note that the present embodiment has been described by assuming a detection of component presence/absence information as GND level of a signal; it is, however, possible to adopt a known method such as a combination of a hall element with a magnet and a detection of a switch contact for example, in terms of obtaining presence/absence information of a joined component when the component is joined, in lieu of being limited to the configuration put forth in the embodiment.

The description has been provided for the case of the serial communication unit being the CAN-BUS; it may be another known mode of communication (e.g., FlexRay, Radio Frequency Identification (RFID) or such), however.

The microscope system according to each of the above described embodiments has exemplified an upright microscope apparatus as the microscope apparatus 1. However, it is apparently possible to employ an inverted microscope apparatus instead. The present embodiment can also be applied to various systems such as a semiconductor inspection apparatus incorporating a microscope apparatus.

Meanwhile, the first and second embodiments are configured such that a certain component in focus transmits component type information of the detected front stage component, along with that of the present component itself, to the microscope control unit. It is of course possible to transmit component type information of a rear stage component, along with that of the present component itself to the microscope control unit by detecting the component type information of the rear stage component, in lieu of being limited to the configuration put forth in the embodiments. It is also possible to transmit the component type information of the front and rear stage components along with that of the present component itself.

Meanwhile, the first and second embodiments are configured to join components to the front and rear stages against a single component (that is, two components are joined to a single component). It is alternatively possible to join three or more components against a single component, in lieu of being limited to the above described embodiments. In such a case, it may be possible to transmit component type information of the plurality of joined components along with that of the present component itself to the microscope control unit.

While the preferred embodiments of the present invention have been described; the present invention, however, can be variously changed and/or improved within the scope of the present invention, in lieu of being limited to the above described embodiments.

The microscope system according to the present invention is contrived to have the CAN-BUS line, power supply line and component recognition code on the component joining surface, thereby making it possible to suppress the number of cables to a minimum, ease the exchange of components and recognize the configuration and mounting position of the component. The present invention therefore enables an interconnected operation without requiring a user setup of the component, an improvement of extendability and a large reduction of load off the user.

What is claimed is:

1. A microscope-use component in a microscope apparatus comprising a plurality of said microscope-use components, wherein each said microscope-use component comprises:
    a communication interface which enables communication with a control device of the microscope apparatus by a prescribed communication system;
    a detection unit for detecting first other component information that is related to a first other component from the first other component which is a connectable first other microscope-use component;
    a detection interface for the detection unit;
    a first connector which comprises the communication interface and the detection interface and which is connectable to the first other component, wherein the first connector is connectable to a predetermined connector of the first other component, thereby enabling the communication interface to be connected to a communication interface of the first other component, and the detection interface to be connected to a predetermined interface in the first other component corresponding to the detection interface; and
    a control unit for transmitting, to the control device of the microscope apparatus by way of the communication interface, the first other component information obtained by the detection unit and present component information that is related to a present microscope-use component itself.

2. The microscope-use component according to claim 1, wherein the first connector further comprises a power supply interface for receiving a supply of power for driving the present microscope-use component.

3. The microscope-use component according to claim 1, further comprising:
    an output for outputting the present component information to a second other component that is a connectable second other microscope-use component;
    an output interface for the output unit; and a second connector which comprises the communication interface and the output interface and which is connectable to the second other component, the second connector being connectable to a first connector of the second other component, thereby enabling the communication interface to be connected to a communication interface of the second other component, and the output interface to be connected to a detection interface in the second other component.

4. The microscope-use component according to claim 3, wherein the the first other component information is component type information related to a type of the first other component, and the present component information is information related to a type of the present microscope-use component itself.

5. The microscope-use component according to claim 3, further comprising:
    a connection component detection unit for detecting whether or not the second other component is connected to the present microscope-use component itself;

a connection component detection interface for the connection component detection unit;
a connection component output unit for outputting information indicating that the present microscope-use component is connected to the first other component; and
a connection component output interface for the connection component output unit,
wherein the second connector further comprises the connection component detection interface, and enables the connection component detection interface to be connected to a predetermined interface of the second other component, and
wherein the first connector further comprises the connection component output interface, and enables the connection component output interface to be connected to a connection component detection interface of the first other component.

6. The microscope-use component according to claim 5, wherein the control unit transmits, to the control device of the microscope apparatus, information about a change in a connection state between the present microscope-use component itself and the second other microscope-use component based on a detection result by the connection component detection unit.

7. The microscope-use component according to claim 6, wherein the control unit transmits, when a connection state between the present microscope-use component itself and the second other microscope-use component is released, an event report to the control device of the microscope apparatus.

8. The microscope-use component according to claim 7, wherein the second other microscope-use component is connectable to a rear stage of the present microscope-use component itself.

9. The microscope-use component according to claim 1, wherein the prescribed communication system is a Controller Area Network (CAN) communication system.

10. A microscope system constituted by combining the microscope-use components according to claim 1.

11. A microscope system constituted by combining the microscope-use components according to claim 7, wherein the control device of the microscope apparatus performs a control for one of shutting off a ray of light from a light source and turning the ray of light off if the ray of light from the light source leaks externally due to a release of a connection when receiving information of an event of releasing the connection between the microscope-use components.

12. A method for obtaining relative connection relationship information between microscope-use components which constitute a microscope apparatus and which are mutually connectable, each of the microscope-use components comprising:
a communication interface which enables communication with a control device of the microscope apparatus by a prescribed communication system,
a detection unit for detecting first other component information related to a first other component from the first other component which is a connectable first other microscope-use component,
a detection interface for the detection unit,
a first connector which comprises the communication interface and the detection interface and which is connectable to the first other component, wherein the first connector is connectable to a predetermined connector of the first other component, thereby enabling the communication interface to be connected to a communication interface of the first other component, and the detection interface to be connected to a predetermined interface in the first other component corresponding to the detection interface, and
a control unit,
wherein the communication interfaces are mutually connected when connectors of the microscope-use components are mutually connected, and
wherein said method comprises:
obtaining the first other component information from the first other component by way of the detection interface and the detection unit; and
transmitting, to the control device of the microscope apparatus by the control unit by way of the communication interface, the obtained first other component information and present component information that is related to a present microscope-use component itself;
wherein the relative connection relationship information comprises information identifying which microscope-use component is connected to a front stage of which microscope-use component, and the relative connection relationship information is obtained by the control device of the microscope apparatus based on the first other component information transmittable from each of the microscope-use components and the present component information.

13. A microscope apparatus, comprising:
plural mutually connectable microscope-use components; and
a control device for controlling each of the microscope-use components,
wherein each of the microscope-use components comprises:
a communication interface which enables communication with the control device by a prescribed communication system,
a detection unit for detecting first other component information that is related to a first other component from the first other component which is a connectable first other microscope-use component;
a detection interface for the detection unit;
a first connector which comprises the communication interface and the detection interface, and which is connectable to the first other component, wherein the first connector is connectable to a predetermined connector of the first other component, thereby enabling the communication interface to be connected to a communication interface of the first other component, and the detection interface to be connected to a predetermined interface in the first other component corresponding to the detection interface; and
a control unit for transmitting, to the control device by way of the communication interface, the first other component information obtained by the detection unit and present component information that is related to a present microscope-use component itself.

14. The microscope apparatus according to claim 13, wherein the first connector further comprises a power supply interface for receiving a supply of power for driving the present microscope-use component itself.

15. The microscope apparatus according to claim 13, wherein each of the microscope-use components further comprises:
an output unit for outputting the present component information to a second other component that is a connectable second other microscope-use component;
an output interface for the output unit; and a second connector which comprises the communication interface and the output interface and which is connectable to the second other component, wherein the second connector is connectable to a first connector of the second other component, thereby enabling the communication interface to be connected to a communication interface of the second other component, and the output interface to be connected to a detection interface in the second other component.

16. The microscope apparatus according to claim 15, wherein the first other component information is component type information related to a type of the first other component, and the present component information is information related to a type of the present microscope-use component itself.

17. The microscope apparatus according to claim 15, wherein each of the microscope-use components further comprises:
a connection component detection unit for detecting whether or not the second other component is connected to the present microscope-use component itself;
a connection component detection interface for the connection component detection unit;
a connection component output unit for outputting information indicating that the present microscope-use component is connected to the first other component; and
a connection component output interface for the connection component output unit,
wherein the second connector further comprises the connection component detection interface, and enables the connection component detection interface to be connected to a predetermined interface of the second other component, and
wherein the first connector further comprises the connection component output interface, and enables the connection component output interface to be connected to a connection component detection interface of the first other component.

18. The microscope apparatus according to claim 17, wherein the control unit transmits, to the control device of the microscope apparatus, information about a change in a connection state between the present microscope-use component itself and the second other microscope-use component based on a detection result by the connection component detection unit.

19. The microscope apparatus according to claim 18, wherein the control unit transmits, when a connection state between the present microscope-use component itself and the second other microscope-use component is released, an event report to the control device of the microscope apparatus.

20. The microscope apparatus according to claim 19, wherein the second other microscope-use component is connectable to a rear stage of the present microscope-use component itself.

21. The microscope apparatus according to claim 13, wherein the prescribed communication system is a Controller Area Network (CAN) communication system.

22. The microscope apparatus according to claim 19, wherein the control device performs a control for one of shutting off a ray of light from a light source and turning the ray of light off if the ray of light from the light source leaks externally due to a release of a connection when receiving information of an event of releasing the connection between the microscope-use components.

* * * * *

UNITED STATES PATENT AND TRADEMARK OFFICE
CERTIFICATE OF CORRECTION

PATENT NO. : 7,613,528 B2 Page 1 of 1
APPLICATION NO. : 11/818933
DATED : November 3, 2009
INVENTOR(S) : Tetsuya Shirota It is certified that error appears in the above-identified patent and that said Letters Patent is hereby corrected as shown below:

Column 16, Line 43, (Claim 3, Line 3);

After "output", insert --unit--.

Column 16, Line 57, (Claim 4, Line 2);

After "wherein", delete "the".

Signed and Sealed this

Sixteenth Day of March, 2010

David J. Kappos
*Director of the United States Patent and Trademark Office*